United States Patent Office 3,410,345
Patented Nov. 12, 1968

3,410,345
STEAM GENERATION WITH HIGH TDS FEED-WATER FOR THERMAL FLOODING OF SUBTERRANEAN OIL RESERVOIRS
Arthur Melvin Fradkin, Woodland Hills, Calif., assignor to Nalco Chemical Company, Chicago, Ill., a corporation of Delaware
No Drawing. Filed Mar. 24, 1966, Ser. No. 536,967
4 Claims. (Cl. 166—40)

ABSTRACT OF THE DISCLOSURE

Secondary petroleum recovery processes embodying treating feedwater with sodium cation exchange resin and hardness-chelating ion exchange resin to provide water with less than one p.p.m. hardness, generating wet steam therewith, and injecting wet steam into subterranean petroleum bearing formation.

---

This invention, in general, relates to improvements in treating of waters containing very high total dissolved solids in oil-producing fields to reduce the hardness thereof to substantially zero whereby these waters may be used as the feedwater for generation of steam employed in the thermal, or steam drive, flooding of subterranean oil reservoirs.

Thermal, or steam drive, flooding of oil reservoirs to reduce viscosity of crudes and thereby increase production was first practiced in 1930. During the past few years renewed attention has been given to this method of increasing production from wells operating at reduced output. Many primary producers are currently evaluating steam stimulation procedures at test sites, and use of portable steam generators to provide heating steam is growing.

The steam generators utliized are generally of the water-tube (single pass or once-through) type, capable of producing wet steam at pressures up to 3000 p.s.i.g. As much as 30% of the feedwater supplied the generator is swept through it with the produced steam, which results in continuous flushing of the tubes and minimizes water-borne deposits. The feedwater quality required differs from that for conventional boilers operating at equivalent temperatures and pressures. Water supplies which ordinarily would be considered unsuitable for conventional boiler operations can frequently be utilized in once-through generators. This is fortunate, for water supplies prevalent in oil producing areas are usually relatively high in total dissolved solids (TDS) and often approach brackish water concentrations (2000 p.p.m. TDS, or higher). In some instances only brackish or saline waters are available for feedwater, e.g., produced water from the oil well itself.

Nevertheless, certain minimum water quality levels must be maintained to assure continuous operation of the steam generator when a well is being stimulated. This invention concerns itself primarily with total hardness (TH) and to procedures by which low residual hardness can be obtained from highly mineralized water supplies.

Currently, water treatment practices center on removal of suspended matter (oil, dirt and precipitated salts), essentially complete removal of total hardness, and reduction of silica (if present in large amounts). Cold or hot lime softeners or zeolite softeners are utilized where the steam demands are large and permanently located equipment is feasible. Where portability is required, skid-mounted filter and zeolite softener units are generally employed.

Steam flooding or steam injection of hydrocarbon-containing subterranean formations is discussed in detail in a Petroleum Engineer Reader Service Reprint article (15 pages) entitled "Why the Quiet Noise over Steam Flooding," by J. E. Kastrop, which is incorporated herein by reference. Touching some highlights thereof, oil recovery through steam flooding is enhanced by dramatic decrease of viscosities of viscous, heavy crudes with the increase in temperature of the oil-bearing formation by the injected steam, steam distillation which vaporizes in the steam zone of the formation substantial portions of the heavy crudes in accordance with the vapor pressures of the respective constituents, thermal swelling of the crudes with temperature rise thereof, and, at least in some cases, the gas-drive displacement of crude oil by the steam itself. Steam injection secondary recovery procedures may follow the water-flooding principle in which the steam is injected into the crude oil-bearing formation through an injection well and the crude oil is recovered or produced from surrounding wells, (the straight forward drive). A second technique is called the modified forward drive, wherein the saturated section is fractured to establish communication between the injection well and the producing well. The remaining two procedures are: the steam soak or priming method, whereby steam is injected for a given time, then stopped and the well put on the pump until production rates decline and the injection cycle can be repeated; and circulating steam around a packer (set high in a long saturated section) by injecting above the packer and pumping through the tubing from below the packer. The wet steam pressures involved are ordinarily in the range of 150-3000 p.s.i., and the wet steam has a liquid phase water content sufficient to maintain a solution of the solids dissolved therein, i.e., up to about 30% by weight of liquid phase water.

The aforesaid article, as well as U.S. Patent No. 3,193,009, describe steam injection of crude petroleum-bearing in underground formations by generation of low grade steam with zeolite-softened water. In the patent process, the steam contains sufficient water in the liquid phase to maintain the soluble salts dissolved therein. This wet steam is injected into the crude petroleum-containing underground formation and is maintained in communication therewith for a time sufficient to improve the flow characteristaics of the crude petroleum material in the formation. The patentee further recommends, if necessary, the addition to the softened water of chelating agents, i.e., the tetrasodium salt of ethylene diamine tetraacetic acid, to chelate magnesium and calcium ions which are not removed by softening steps.

This invention applies to steam injection processes wherein the TDS (at least 5000 p.p.m.) and total hardness of the water are too high to be employed in the steam injection processes by utilizing zeolite softening alone or in combination with addition of hardness ion chelating agents. These high TDS and total hardness values provide an alkali metal ion concentration under which alkali metal competes with the hardness ions for the exchange sites on the cation exchange resins to the degree that softened water effluents with hardnesses lower than about 2 p.p.m., as $CaCO_3$, cannot be realized even with multiple cation exchange resin treatments in series.

When the TDS of the water to be utilized is in the range of several hundred to 2000 p.p.m., single zeolite softeners regenerated with 6 to 15 pounds of salt per cubic foot of resin effectively produce an effluent TH of less than 1 p.p.m. When the TDS exceed 2000 p.p.m. and approach 5000 p.p.m., however, higher salting levels, countercurrent (to exhaustion flow) regeneration of single softeners, series-operated dual softeners or combinations of these techniques are employed to produce the one p.p.m. maximum TH level required.

None of the current techniques is capable of producing essentially zero soft water (maximum of one p.p.m. TH, as $CaCO_3$) at feedwater TDS levels in excess of approximately 5000 p.p.m., and water supplies of this character are not used in steam flood service. However, as thermal recovery operations expand to areas where alternate, lower TDS supplies are not available, treatment of water in the range of 5000 to 30,000 p.p.m. (and higher) TDS will almost certainly be required. The invention herein is directed to adaptation of an exchange-related process to conventional zeolite softening to permit extension of this technique to treatment of the highly brackish waters frequently found in oil producing localities.

Briefly, the present invention relates to improvements in processes for secondary recovery of petroleum from subterranean petroleum deposits by the aforedescribed thermal, or steam drive, flooding of subterranean oil reservoirs. The feedwater for the steam generators thereof is, in the case of this invention, heretofore troublesome water having a TDS of at least 5000 p.p.m., and usually at least 10,000 p.p.m. The calcium and magnesium hardness of this type feedwater usually is at least 500 p.p.m., as $CaCO_3$, although waters of 5000 or more TDS may occasionally be encountered wherein total hardness runs lower than 500 p.p.m., e.g., between about 100 and 500 p.p.m. The alkali metal salt content (all or most being sodium salts with perhaps some potassium salts) of these high TDS waters is usually about 90% or more of the total dissolved solids, with the remainder of the dissolved salts being salts of magnesium, calcium, iron, barium, strontium and/or the like, depending upon the mineral character of the locale. Again, however, waters may occasionally be encountered wherein the alkali metal salt content may be in the order of only 50–90% of the total dissolved solids.

The feedwater is treated with a cation exchange resin in the sodium form (i.e., one having exchangeable sodium ions) to replace most of the dissolved hardness cations with sodium ion in a single softener or in a series of two or more softeners. This treatment reduces hardness ion concentration in the water to about 2–200 p.p.m., as $CaCO_3$.

Thereafter, the softened feedwater is treated with a chelate exchange resin which selectively chelates the residual hardness ions in the presence of high amounts of sodium ion. This treatment is a polishing step which reduces hardness ion to less than one p.p.m., as $CaCO_3$, i.e., essentially zero hardness.

The cation exchange resin and the chelate exchange resin are employed in solid, particulate form, usually as a bed of exchange resin particles through which the high TDS feedwater flows by gravity or force feed. The temperature of the water and ion exchange bed is ordinarily ambient temperature, although higher or lower temperatures in the order of 40–180° F. may be used.

Cation exchange resins in the sodium form for effecting replacement in the treated water of sodium ion for calcium ion and magnesium ion are well known in the art. The term "cation exchange resins," as employed herein, embraces naturally occurring ion exchange minerals, synthetically formulated ion exchange minerals, and synthetic, organic polymer matrices with ion exchange sites such as sulfonate groups in the sodium form.

The chelate exchange resins are resins of the character described in Mock et al. U.S. Patent No. 2,980,607, issued Apr. 18, 1961. The chelate exchange resins have in their polymeric structure at least 80% by weight of a chemical unit having the formula

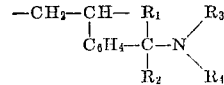

wherein the symbol $R_1$ represents a radical selected from the group consisting of —H, —$CO_2M$, and —$CH_2CO_2M$; the symbol $R_2$ represents a radical selected from the group consisting of —H and —$CH_3$; each of the symbols $R_3$ and $R_4$ individually represents a radical selected from the group consisting of —H, —$CH_3$, —$CH_2$—$C_6H_4$—$CH$=$CH_2$, —$CH_2CO_2M$,
—$CH_2CH_2CO_2M$, —$CH(CO_2M)CH_2CO_2M$,
—$CH_2CH_2$—$N(CH_2CO_2M)_2$,
—$CH_2CH_2CH_2$—$N(CH_2CO_2M)_2$, and

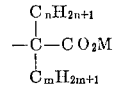

where $n$ is an integer from 1 to 4, $m$ is an integer from 0 to 2, and M is a cation, and wherein at least one of the radicals represented by the symbols $R_1$, $R_3$, and $R_4$ contains a —$CO_2M$ group which together with the nitrogen atom constitutes a metal-chelating group.

Exemplary of such chelate exchange resins are the polymers of N-(ar-vinylbenzyl)iminodiacetic acid, N-(ar-vinylbenzyl)aspartic acid, 2-(vinylphenyl) glycine, and N,N-bis(ar-vinylbenzyl)glycine.

The preferred forms thereof are resins having, as the chelate ion exchange groups, the iminodiacetic acid sodium salt radical, —$N(CH_2COONa)_2$, on a styrene-divinylbenzene copolymer matrix.

The chelate exchange resins can be employed in acid or salt form of the carboxylic acid groups, and can be employed with aqueous liquid solutions having pH values greater than approximately one. Since the proton is a competitor of the metal ions for the carboxy group, the capacity of the chelate exchange resin for metal ions in acidic solutions diminishes with the pH value of the contacting solution. Preferably, the contacting solution of chelate-forming metal ions should have a pH value of at least 3, e.g., from 3 to 14. Because the reaction of each chelate-forming metal ion with the carboxylic acid ligand liberates at least one proton, the chelation reaction tends to lower the pH value of the contacting solution. For this reason, and to maintain substantially constant pH values during the treating operation, it is sometimes desirable to provide a pH buffer in the solution to be treated.

The metal-laden resin can be regenerated and the metals bound thereto can be recovered by elution with, for example, an aqueous solution of a strong acid, i.e., a solution of an acid having an ionization constant of at least $10^{-6}$. Usually, the solution remaining in the resin bed at the end of the loading cycle is flushed out, e.g., by means of more of the conditioning solution used prior to feeding the starting solution, and the resin is eluted. A suitable eluent for the metals whose chlorides are soluble in water is hydrochloric acid. Nitric or sulfuric acid can also be used to elute metals whose corresponding salts are soluble in water. The eluent can be fed to the resin bed in the same or different direction relative to the flow of the solution in the loading cycle, and at similar rates and temperatures. Sulfuric acid is the most economical acid regenerant, and regeneration may be achieved by two or three progressive elutions of the spent resin over an acid range of from an initial elution with about 0.5–2% $H_2SO_4$ and subsequent elutions at increasing $H_2SO_4$ concentration up to about 5% $H_2SO_4$.

The preferred chelate exchange resin is an ion exchange resin based on a styrene-divinylbenzene copolymer matrix to which iminodiacetic acid groups are attached. The sodium salt of the resin (with R representing the copolymer matrix) is represented as:

(1)   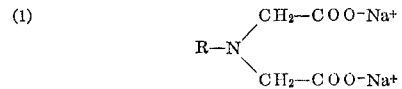

The arrangement of nitrogen and carboxylic acid groups results in an ion active resin which exhibits a marked selectivity for heavy metal and alkaline earth cations ($Cu^{+2}$, $Fe^{+3}$, $Ca^{+2}$, $Mg^{+2}$) over the alkali metals ($Na^+$, $K^+$). For example, the resin completely removes trace quantities (25–50 p.p.m.) of $Ca^{+2}$ and $Mg^{+2}$ from saturated NaCl brines. Regeneration is accomplished by initial treatment with an acid (HCl, $H_2SO_4$) to remove the heavy metal or alkaline earth cation, followed by conversion of the free acid form resin to the corresponding alkali metal form with an appropriate alkali:

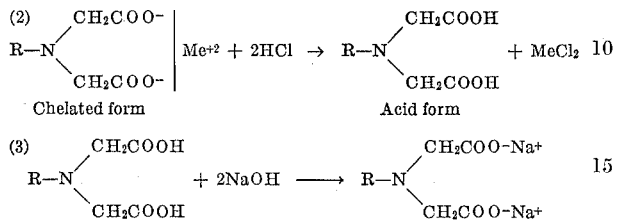

Although the feedwater quality requirements will vary somewhat for each steam generator, depending on design, Table I tabulates generally accepted upper limits for constituents commonly encountered. The limits shown approximate those for conventional boilers, except that no limits for total soluble solids are imposed. The unique design of oil field steam generators, which allows the tubes to be continuously swept free of soluble salts, permits use of saline supplies which are otherwise free of suspended or precipitating salts. There is some evidence that dissolved salts in wet steam are beneficial in minimizing the swelling of clays present in the stimulated strata, thereby maintaining the porosity necessary for successful oil recovery. However, almost all fabricators of generators specify a 1 p.p.m. TH feedwater limit.

in test water. Regenerant for the secondary cation exchange resin was 34 lbs. NaCl per cubic foot of resin, as a 10% solution in test water. Regenerant for the chelate exchange resin was 2.25 lbs. 100% HCl per cubic foot of resin, as a 2.5% solution in test water, followed by 2.5 lbs. NaOH per cubic foot of resin, as a 2% solution in softened test water. The primary cation exchange resin was regenerated co-current (downflow); the secondary cation exchange resin was regenerated countercurrent (upflow). The chelate exchange resin was regenerated co-current (downflow) with the acid and countercurrent (upflow) with the alkali. Flow rates were 8 gallons per minute per square foot of resin bed (3.2 gallons per minute per cubic foot). Analysis for total hardness was done by the standard EDTA titration technique.

Separate beds of Dowex HCR–W cation resin were alternately exhausted with test waters TS–10, –20, –30 and regenerated until cyclic equilibrium was established. The regenerative effect of increased NaCl content in the feedwater is readily apparent.

The average leakage discharged in the effluent from the primary softener operating on 10,000 p.p.m. TDS supply (TS–10) to 25 kilograin per cubic foot capacity is 170 p.p.m. TH. The secondary zeolite softening runs were made on TS–10 (10,000 p.p.m. TDS) and TS–20 (20,000 p.p.m. TDS) containing 170 p.p.m. TH and 420 p.p.m. TH, respectively. Based on the high leakage resulting from primary treatment of water TS–30 (30,000 p.p.m. TDS), and the certainty that leakage from subsequent secondary softening would be unacceptably high, no further tests were carried out on this feedwater. It is apparent that even at the low exhaustion capacities to TABLE I.—TYPICAL FEEDWATER LIMITS SPECIFIED FOR STEAM GENERATORS IN THERMAL FLOOD OPERATIONS

| | |
|---|---|
| Total hardness, Ca and Mg, as $CaCO_3$ | 0–5 p.p.m. range; 1 p.p.m. max. usual. |
| Sodium and potassium | No upper limit specified. |
| Ferrous and ferric iron, as $Fe^{+3}$ | 0.1 p.p.m. |
| Alkalinity, $HCO_3^-$ and $CO_3^=$, as $CaCO_3$ | 25–50 p.p.m. |
| Chloride | No upper limit specified. |
| Sulfate | Do. |
| Nitrate | Do. |
| Total dissolved solids | Do. |
| Hydrogen sulfide, as $H_2S$ | 0–1 p.p.m. range. |
| Turbidity | 0–5 p.p.m. range; 1 p.p.m. max. usual. |
| Oil | 1 p.p.m. max. |
| Silica, as $SiO_2$ | 20 p.p.m. max. |

Because brackish waters associated with petroleum deposits vary widely, one typical water was selected as a base, with the higher TDS supplies synthesized in multiples of the base. The TH to TDS ratio was 1:10 in all tests. The compositions of test waters evaluated are reported in Table II.

TABLE II.—TYPICAL OIL FIELD BRINES, PRIMARY SOFTENING (REPORTED AS P.P.M. $CaCO_3$ EQUIVALENT)

| | TS–10 | TS–20 | TS–30 |
|---|---|---|---|
| Test Water Code: | | | |
| TDS | 10,000 | 20,000 | 30,000 |
| TH | 1,000 | 2,000 | 3,000 |
| CaH | 700 | 1,400 | 2,100 |
| MgH | 300 | 600 | 900 |
| Na | 9,000 | 18,000 | 27,000 |
| $HCO_3$ | 110 | 220 | 330 |
| $SO_4$ and Cl [1] | 9,890 | 19,780 | 29,670 |

[1] Cl to $SO_4$ ratio adjusted 2:1, modified, as required, to maintain $CaSO_4$ solubility and solution stability.

The primary (and secondary) cation exchange resin employed was Dowex (trademark) HCR–W (trademark), 20–50 mesh, 30 inch bed depth. This resin is a strong acid resin in the sodium form and has a styrene-divinyl benzene matrix.

The chelate exchange resin was Dowex (trademark) A–1, 20–50 mesh, 30 inch bed depth. This resin has the chemical composition above-identified for the preferred chelate exchange resin.

Regenerant for the primary cation exchange resin was 20 lbs. NaCl per cubic foot of resin, as a 10% solution which the secondary cation exchange resins are normally exhausted, hardness leakages at these TDS levels make the treated waters unacceptable for steam generator makeup, TH leakages of 18–22 and 106–160 p.p.m. at 2, 4 and 6 kgr./ft.$^3$.

Chelate resin beds, regenerated as specified, were subjected to simulated secondary softening runs on test waters TS–10 and TS–20 containing 170 p.p.m. and 420 p.p.m. TH, respectively. Exhaustion cycles were first obtained at a flow rate at 4 gallons per minute per square foot (1.6 gallons per minute per cubic foot). Reduction of hardness to zero (by EDTA titration) occurs throughout each run with a sharp break of hardness as the exhaustion point is reached. To 1 p.p.m. leakage, a capacity of 9.3 kilograins per cubic foot is realized on water TS–20 at this flow rate.

In subsequent chelate secondary softening runs with waters TS–10 and TS–20, the exhaustion flow rate was increased to 8 gallons per minute per square foot (3.2 gallons per minute per cubic foot). Complete removal of TH from the primary zeolite effluents of the test waters is obtained; a two-fold increase in flow rate of water TS–20 does not affect leakage, but decreases capacity to initial hardness breakthrough by approximately 2 kilograins per cubic foot, or 25%.

The effect of a three-fold increase in flow rate (12 gallons per minute per square foot or 4.8 gallons per minute per cubic foot), on test water TS–20 indicated that no leakage is apparent throughout the run to breakthrough, but capacity is reduced 40% from that obtained at 1.6 gallons per minute per cubic foot.

The capacity of the chelate exchange resin in secondary softening decreases somewhat as the TDS level increases. The ability to produce zero hardness effluent is not affected, however.

The completeness of hardness removal is not affected by the hardness content of the influent supply. In direct primary softening of another test water of 20,000 p.p.m. TDS containing 1000 p.p.m. TH, complete hardness removal is obtained, with sharp breakthrough at exhaustion.

Similarly, the ratio of TH to TDS has no effect on completeness of TH removal. In tests conducted to study hardness removal from saturated sodium chloride brines (approximately 250,000 p.p.m. NaCl) complete removal of calcium and magnesium contamination at 50–100 p.p.m. concentration occurs.

As an example of field application of the invention, zeolite softening unit or units and the chelating resin softening unit or units are set up at the oil well site in a pumping system which draws brackish, high TDS water (at least 10,000 p.p.m. TDS) from a source reasonably near the site. The high TDS water is pumped through a filter and then into the zeolite softener containing a bed of a sulfonated styrene-divinylbenzene polymer in the sodium form. The water flows downwardly through the bed by gravity flow or by forced flow at a rate of about 1–4 gallons per minute per cubic foot of bed. The effluent is pumped to a chelating resin softening unit containing a bed of a resin comprising the aforesaid styrene-divinylbenzene copolymer with iminodiacetic acid sodium salt groups. The effluent, which still contains about the same TDS content, has essentially zero hardness.

The latter effluent is fed to a portable, single pass, water-tube steam generator set up on the site. Fired by gas recovered at the site or by gas or other fuel brought or piped to the site, the steam generator generates wet steam (containing about 5–10% water in the steam) at a pressure in the order of 1500–2000 p.s.i.g. The wet steam is conducted into the tube of a steam injection well and is discharged into the oil-bearing formation at high pressure. The steam permeates the formation, its heat reducing the viscosity of the crude oil in the oil-bearing formation and its pressure driving the oil toward producing wells in the vicinity of the injection well.

The invention is hereby claimed as follows:

1. A process for secondary recovery of petroleum from subterranean petroleum deposits, which comprises treating feedwater having a total dissolved solids content of at least 5000 p.p.m., an alkali metal salt content of at least about 50% of the total dissolved solids, and a total hardness of at least about 100 p.p.m., as $CaCO_3$, with a cation exchange resin having exchangeable sodium ions to reduce the total hardness of said water to a value in the range of about 2–200 p.p.m., as $CaCO_3$, then treating the resultant, partially softened water with a chelate ion exchange resin which selectively chelates essentially all of the residual hardness ions of said partially softened water to provide a treated feedwater having a hardness of less than one p.p.m., as $CaCO_3$, said chelate ion exchange resin being an organic polymer having in the polymeric structure at least 80% by weight of a monomer unit having the formula

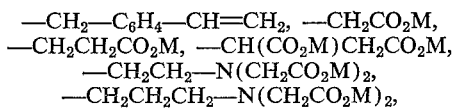

wherein the symbol $R_1$ represents a radical selected from the group consisting of —H, —$CO_2M$, and —$CH_2CO_2M$; the symbol $R_2$ represents a radical selected from the group consisting of —H and —$CH_3$; each of the symbols $R_3$ and $R_4$ individually represents a radical selected from the group consisting of —H, —$CH_3$, —$CH_2$—$C_6H_4$—$CH$=$CH_2$, —$CH_2CO_2M$,
—$CH_2CH_2CO_2M$, —$CH(CO_2M)CH_2CO_2M$,
—$CH_2CH_2$—$N(CH_2CO_2M)_2$,
—$CH_2CH_2CH_2$—$N(CH_2CO_2M)_2$, and

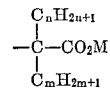

where $n$ is an integer from 1 to 4, $m$ is an integer from 0 to 2, and M is a cation, and wherein at least one of the radicals represented by the symbols $R_1$, $R_3$, and $R_4$ contains a —$CO_2M$ group which together with the nitrogen atom constitutes a metal-chelating group, feeding said last-mentioned treated feedwater to a water-tube steam generator and therein generating wet steam containing up to about 30% of said treated feedwater as liquid phase water, conducting said wet steam into a well at a petroleum well site and injecting the latter under pressure into a subterranean petroleum bearing formation.

2. A process as claimed in claim 1 wherein said wet steam has a pressure of at least 150 p.s.i.g.

3. A process as claimed in claim 1 wherein said chelate ion exchange resin consists essentially of a styrene-divinylbenzene copolymer matrix having a plurality of iminodiacetic acid sodium salt chelating groups.

4. A process as claimed in claim 1, wherein said feedwater has an alkali metal salt content of at least 90% of the total dissolved solids.

References Cited

UNITED STATES PATENTS 2,980,607   4/1961   Mock et al. _____ 210—31
3,193,009   7/1965   Wallace et al. _____ 166—40 X

OTHER REFERENCES

Burns, "Water Treatment for Once-Through Steam Generators," Journal of Petroleum Technology, vol. XVII, No. 4, April 1965 (pp. 417–421).

STEPHEN J. NOVOSAD, *Primary Examiner.*